United States Patent [19]

Turner et al.

[11] 3,721,329

[45] March 20, 1973

[54] METHOD AND APPARATUS FOR ORIENTING WOOD FLAKES

[75] Inventors: Harold Dale Turner; John Karl Fletcher, both of Hot Springs, Ark.

[73] Assignee: Weyerhaeuser Company, Tacoma, Wash.

[22] Filed: Nov. 22, 1971

[21] Appl. No.: 201,221

Related U.S. Application Data

[63] Continuation of Ser. No. 13,993, Feb. 25, 1970, abandoned.

[52] U.S. Cl....................................198/33 R, 198/56
[51] Int. Cl.............................................B65g 47/00
[58] Field of Search......198/33.2, 56, 33 R; 221/171, 221/173

[56] References Cited

UNITED STATES PATENTS

| 1,341,238 | 5/1920 | Mason | 198/33.1 |
| 1,476,936 | 12/1923 | Walden | 198/190 |
| 1,876,066 | 9/1932 | Logan | 198/33.1 |
| 2,825,388 | 4/1958 | Hale et al. | 198/56 X |
| 3,507,380 | 4/1970 | Sarovich et al. | 198/130 |

Primary Examiner—Evon C. Blunk
Assistant Examiner—Hadd S. Lane
Attorney—P. D. Coogan et al.

[57] ABSTRACT

A machine for aligning elongated wood flakes with their longitudinal axes in substantial parallelism to one another has a continuous, serpentine chain arranged at an aligning station to present a plurality of spaced-apart rows movable in alternate directions. Upstanding projections are equally spaced along the length of the chain to present oppositely moving projections in adjacent rows when the machine is in operation. As the oppositely moving projections engage flakes issuing from a feeder either individually or in clusters, the clusters are broken up and the flakes rotated through an arc to orient the same for subsequent gravitation between the rows of the chain.

7 Claims, 7 Drawing Figures

INVENTORS
Harold O. Turner
John K. Fletcher
ATTORNEYS

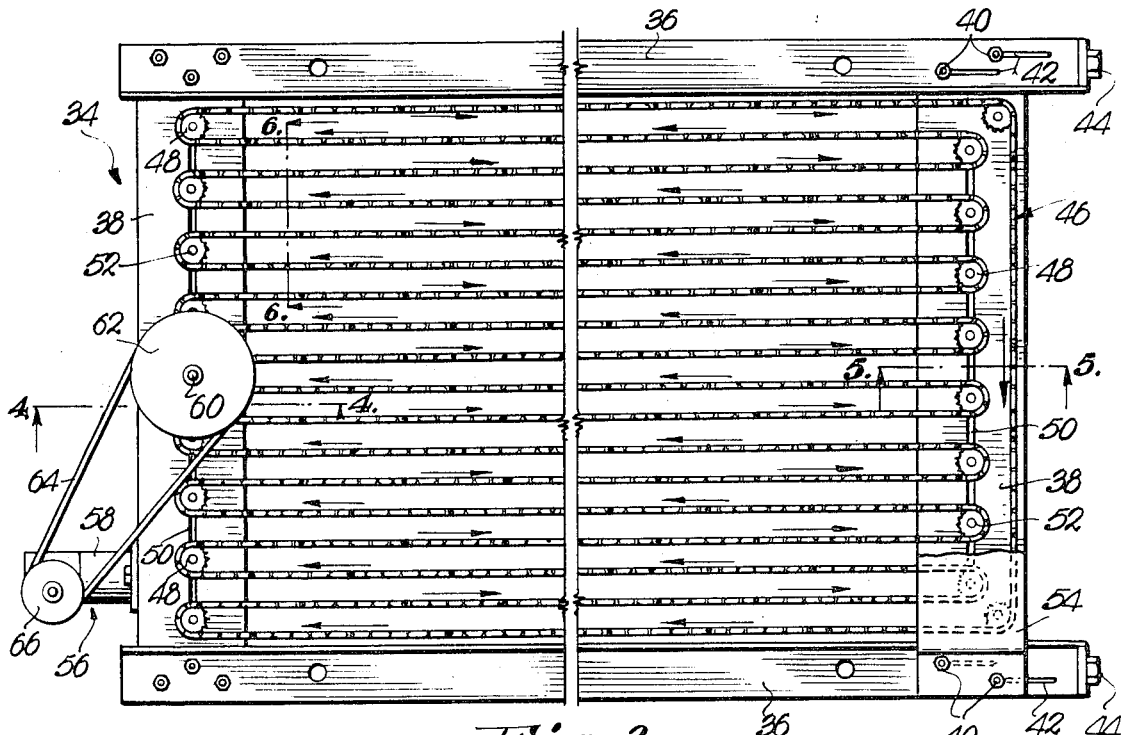
Fig. 3.
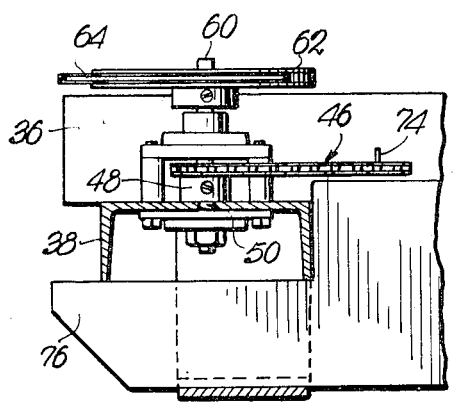
Fig. 4.
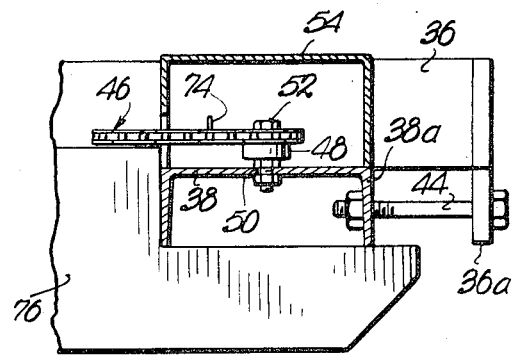
Fig. 5.
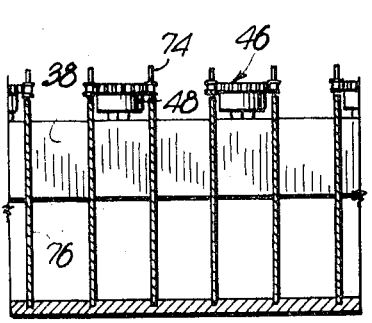
Fig. 6.
Fig. 7.
Harold D. Turner
John K. Fletcher
INVENTORS.
BY Schmidt, Johnson, Hovey
Williams & Chase
ATTORNEYS.

METHOD AND APPARATUS FOR ORIENTING WOOD FLAKES

This is a streamlined continuation of application Ser. No. 13,993 filed Feb. 25, 1970, now abandoned.

This invention relates to an apparatus for effecting alignment of elongated, treated wood flakes with their longitudinal axes in substantial parallelism to one another to form a mat which will thereafter be compressed to form a flakeboard panel.

A flakeboard panel consisting of aligned, elongated wood shavings or flakes compressed and held together by a suitable binding medium has certain structural properties and other characteristics which make its manufacture and use desirable. For instance, the parallel alignment of the flakes produces an effect which closely resembles grain in a regular piece of lumber or plywood. Accordingly, the physical properties of a properly manufactured flakeboard approach those of regular lumber or plywood, thereby making the flakeboard suitable for use in load-bearing situations. Yet, the use of a flakeboard in such situations may be more economical in the long run than using regular structural products. This is in part due to the fact that the structural properties of flakeboards may be closely regulated during manufacture thereof, thereby insuring uniformity of properties, much in the same manner as in the production of paper. Lumber, on the other hand, is subject to widely divergent structural properties, thereby giving rise to the need for high factors of safety in structural situations, which in turn requires that more lumber be used for the specific purpose than is often actually necessary.

Further benefits are derived from an economic standpoint through the use of flakeboards since the flakes of such boards may be produced from wood of substantially lower quality than normally goes into structural lumber or plywood. For example, while lumber having knotholes therein may not be suitable for structural use because of weakness in the area of the knotholes, the wood comprising such lumber would generally be suitable as a flake supply, so long as that wood lends itself well to shaving or flaking.

Other benefits derived from this process include the use of small trees unsuited to conventional lumber conversion and trees of low quality or of species not currently harvested for structural uses. Manifestly, this represents substantial economic gains.

In order for a flakeboard to be produced which has the desirable characteristics as discussed above, it is necessary that means be provided for orienting randomly disposed wood flakes into their proper alignment. However, handling and alignment of the flakes is somewhat difficult in view of their relatively thin dimensions (optimum thickness is approximately 0.015 inches) and the fact that they tend to gather in clusters during processing. Accordingly, the flakes must be separated from such clusters prior to or during alignment, and, because of their thinness and lack of mass, must be closely controlled to prevent re-randomization once they have been properly aligned.

It is, therefore, an important object of the present invention to provide a machine for aligning elongated articles such as wood flakes with their longitudinal axes substantially parallel to one another which is fast in operation and is highly efficient in that it properly aligns a high percentage of flakes it encounters without damaging the same during alignment thereof.

A further important object of the invention is to provide an aligning machine as aforesaid which is capable of breaking up clusters of the flakes fed into the machine and properly orienting the flakes separated therefrom.

Another important object is to provide a wood flake aligning machine which may be easily incorporated into a process line for producing a board product having certain uniform structural properties.

Yet another important object of the instant invention is the provision of adjustable structure within such an aligning machine which permits flake mats of various thicknesses to be produced without losing control of the flakes as they are aligned and deposited during formation of the mat.

In the drawings:

FIG. 3 is an enlarged, fragmentary top plan view of the aligning apparatus, part of the sprocket housing being broken away to reveal details of construction;

Figure 1:
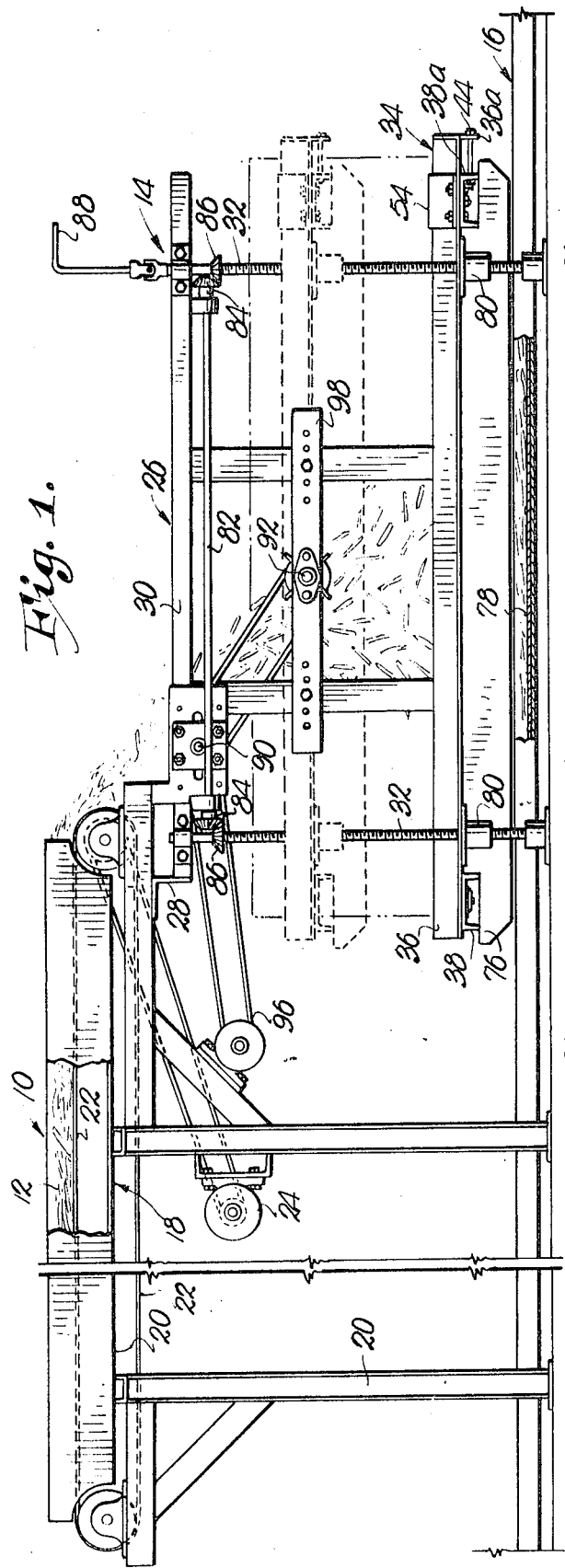
FIG. 1 is a side-elevational view of an aligning machine embodying the principles of the present invention, an alternate position for the aligning apparatus being indicated by broken lines.

FIGS. 4 and 5 are enlarged, fragmentary, detailed cross-sectional view taken along lines 4—4 and 5—5 of FIG. 3 respectively;

FIG. 6 is an enlarged, fragmentary cross-sectional view taken along line 6—6 of FIG. 3 illustrating the vertical aligning plates disposed beneath the aligning chain; and FIG. 7 is an enlarged, fragmentary, detail view of the aligning chain illustrating the projections which break up the clusters of flakes when the machine is in operation.

The aligning machine of the present invention basically includes a feeder or conveyor unit 10 for delivering randomly oriented wood flakes 12 which have been pre-coated with a suitable binding medium from a source of supply, an aligning station 14 at the discharge end of feeder 10 for effecting the actual alignment of the flakes 12, and a moving caul unit 16 beneath station 14 for receiving the aligned flakes 12 and conveying the same to a subsequent station where the flakes are compressed and heated to form a flakeboard. The feeder 10 is supported above the factory floor by suitable supporting structure such as a frame 18 comprised of vertical and horizontal channel members 20. A conveyor belt 22, which carries the flakes 12 toward the aligning station 14 after they have been deposited upon belt 22 by means of a hopper or other suitable apparatus (not shown), is driven by a motor and belt assembly 24 supported on one of the vertical frame channels 20.

The aligning station 14 includes a frame 26 which is rigidly secured to the feeder frame 18 at the discharge end thereof by a number of gussets 28 in order to maintain the feeder 10 and station 14 in proper location with respect to one another during operation of the machine. Frame 26 includes an upper rectangular section 30 carrying the gussets 28, and four upright legs 32 stationed at each corner of section 30 and supporting the latter above the floor. The legs 32 also carry the aligner mechanism 34 in proper disposition above caul unit 16 and below the rectangular frame section 30.

Figure 2:
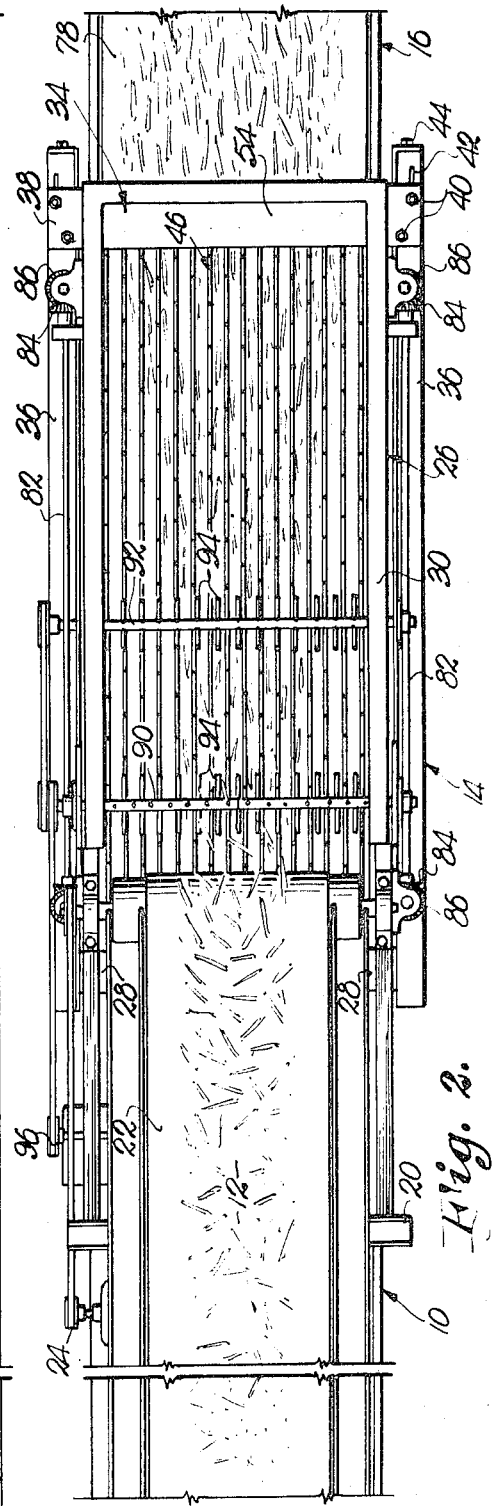
FIG. 2 is a fragmentary, top plan view thereof.

The aligner mechanism 34 as best shown in FIGS. 2 and 3 is supported by a rectangular carriage formed by a pair of angle members 36 presenting the sides thereof, and a pair of channel members 38 bolted to opposite ends of the angles 36 to present the ends of the carriage. The right channel member 38 viewing FIG. 3 is made shiftable with respect to the angles 36 for a purpose which will hereinafter become clear through the use of releasable bolts 40 projecting through elongated slots 42 within the angles 36. An adjusting bolt 44 (FIG. 5) interconnecting a depending flange 36a on each angle 36 and one leg 38a of the right channel 38 provides incremental adjustment of channel 38 after bolts 40 have been sufficiently loosened.

A continuous, serpentine roller chain 46 is stretched across the open space defined by the channels and angle members 36 and 38 respectively to present a substantially planar zone for orienting flakes 12 as they are received from the feeder 10. Freewheeling sprockets 48 are received within elongated longitudinal slots 50 in the channels 38 and carry the chain 46 in an arrangement whereby the latter presents a series of flat loops having a sprocket 48 at the bight of each loop respectively. The sprockets are equally spaced along the channels 38, thereby presenting a pair of spaced-apart rows of chain for each loop. The relative spacing of the sprockets 48 may be varied through the feature of a double-nut arrangement on the bolt 52 which projects through the slot 50 and supports each sprocket 48. However, when a change in spacing is desired, different size sprockets must be used since the pitch diameter of the sprockets must be equal to the chain spacing. For proper operation of the aligning station 14, the rows of the chain should be spaced apart a distance less than the effective length of a wood flake. A transversely U-shaped housing 54 encloses the sprockets 48 on the right channel 38.

A belt drive assembly 56 mounted on the left channel member 38 is operably connected to the chain 46 for driving the latter, which causes alternate rows of chain 46 to move in opposite directions as indicated by the arrows in FIG. 3. A suitable motor 58 in the drive assembly 56 is connected to one of the sprockets 48 by means of a central shaft 60 common to both a large sheave 62 and the sprocket 48. Sheave 62 is in turn drivingly connected to the motor 58 through a belt 64 and a smaller sheave 66.

The roller chain 46, shown in somewhat more detail in FIG. 7, is composed of pairs of opposed spaced-apart links 68 which are pivotally joined end-to-end by stub shafts 70 spanning the distance therebetween. Cylindrical, hollow rollers 72 circumscribe each of the shafts 70. Certain equally spaced shafts 70 have enlarged portions which extend outwardly beyond their respective links forming projections or probes 74 which are substantially greater in height than the thickness of any of the flakes 12. In this manner it may be seen that a series of the probes 74 are provided in each row of the chain 46 presenting an irregular surface for receiving flakes form the feeder 10.

A series of vertical plates 76 (FIG. 6) spanning the length of aligner mechanism 34 are supported by the channels 38 beneath the chain 46, each of the plates 76 being disposed directly below one row of chain 46 such that a plurality of narrow passages are presented for receiving properly aligned flakes. The caul unit 16 includes means for moving a suitable mat-forming receptacle 78 beneath aligner mechanism 34 for receiving flakes after they have passed between the plates 76.

In view of the lightness of the individual flakes, it is particularly helpful to control the same by means of the plates 76 for as long as possible after they have been properly aligned. For this reason it is normally desirable to maintain the lowermost edges of plates 76 but a slight distance above the mat which is being formed therebeneath. In some instances, mats of other than standard thicknesses are necessary or desirable, whereupon the height of mechanism 34 relative to caul unit 16 must be varied. Accordingly, the legs 32 of the aligner frame 26 are threaded along their lengths for cooperating with interiorly threaded shoulder units 80 carrying the angles 36, providing for vertical adjustment of the aligner mechanism 34. A pair of horizontal, forward-to-rear shafts 82 directly beneath frame section 30 on opposite sides thereof have a pair of bevel gears 84 at their opposite ends which mesh with cooperating bevel gears 86 on the upper ends of vertical legs 32. The legs 32 are journalled by suitable bearing apparatus at their opposite ends, and a removable crank 88 on two of the legs 32 provides means for rotating the legs 32 and hence raising or lowering the aligner mechanism 34 as required.

A pair of rotatable shafts 90 and 92 are disposed across the path of flake delivery from feeder 10, and have a plurality of radially projecting fingers 94 spaced along their lengths in parallelism with the rows of chain 46 for imparting a dispersive force to the flakes as they issue from feeder 10. The shaft 90 is supported between opposed members of the upper frame section 30 for adjustable movement toward and away from feeder 10, and is driven by a motor and belt assembly 96 supported on the feeder frame 18. The shaft 92 is supported below shaft 90 and forwardly spaced therefrom between support members 98 of frame 26. A belt interconnecting shafts 90 and 92 permits them to be driven through the same assembly 96.

In preparing the aligning machine for use, it is first necessary to consider the depth of the flake mat to be produced, and the lengths of the strands which will be used in forming such mat. As before mentioned, retaining continued control over the flakes once they have been aligned in the aligner mechanism 34 is an important step in preparing a proper mat and, accordingly, through the use of cranks 88 the lowermost edges of the vertical plates 76 should be positioned as closely as possible above the mat which will be moving and forming therebeneath. Once this preliminary adjustment has been performed, the aligning machine is in proper condition to begin an operating cycle.

Actuation of the motor 24 places the feeder 10 in condition to begin receiving binder-coated wood flakes from a hopper or the like (not shown), and for delivering the flakes toward the aligning station 14. Likewise, actuation of motor 58 activates the aligner mechanism 34, and actuation of motor 96 places the multi-fingered shafts 90 and 92 in operation.

As the randomly oriented wood flakes are first deposited on the feeder belt 22, they tend to gather in clusters, and hence issue from the discharge end of belt 22 both as individual flakes and as clusters of individual flakes. As the flakes gravitate downwardly after issuing from feeder 10, they first encounter the rotating fingers on shaft 90, and thence those of shaft 92. This imparts a dispersive force to the clusters.

Continued gravitation by the flakes causes them to land on the moving rows of chain 46. Proper spacing of the rows of belt 46 insures that the flakes will straddle adjacent rows rather than pass therebetween, except for those flakes which are aligned with their longitudinal axes parallel to the chain rows. Immediately upon landing, the clusters and individual flakes are engaged by oppositely moving projections 74 in adjacent rows which causes the clusters to break up as the flakes are rotated through an arc to bring their longitudinal axes in parallel alignment with one another and with the rows of the chain 46.

As the flakes become aligned, they are free to gravitate between the rows of chain 46, and thence between adjacent plates 76 into the receptacle or belt 78 of caul unit 16. Thereafter, the mat thus formed may be conveyed to a following station where the flakes may be subjected to pressure and heat to form the finished flakeboard product.

It will be appreciated that the relatively large number of chain rows as well as the accompanying large number of projections 74 insures not only that flakes in clusters as well as those individually presented will be aligned, but also that such flakes will be oriented with a high degree of accuracy and efficiency. Moreover, the large number of projections 74 makes it unnecessary to operate chain 46 at high speeds to effect alignment, thereby reducing the risk of damage to the flakes.

Having thus described the invention, what is claimed as new and desired to be secured by Letters Patent is:

1. A method for forming a mat of a given thickness from thin wood flakes, which are several times wider than thick and several times longer than wide comprising:

establishing a mat formation supporting surface;

positioning above said surface a distance slightly greater than said mat thickness parallel orienting rows having a plurality of projections extending vertically therefrom to a height greater than several times said flake thickness with adjacent rows spaced from one another a distance less than said length of said flakes;

feeding randomly oriented flakes from a source of supply toward said surface, forming clusters of several flakes thickness on said rows and in a path passing through said rows;

moving the projections in one row relative to the projections in an adjacent row for contacting said flakes with both of said projections, disengaging said flakes from said clusters and orienting said flakes to a position permitting them to fall between said adjacent rows forming a continuous mat of said mat thickness on said surface with said flakes oriented with their longitudinal axis generally parallel to said rows.

2. The method of claim 1 wherein:

the projections in said one row are moved along said one row in an opposite direction from the direction the projections in said adjacent row are moved along said adjacent row.

3. A means for forming a mat of a given thickness from thin wood flakes, which are several times wider than thick and several times longer than wide comprising:

a mat supporting means including a supporting surface;

alignment means positioned above said supporting surface and including a plurality of horizontally extending orienting means having a series of projection means extending vertically from said orienting means to a height greater than several times said flake thickness and spaced along the length thereof to form parallel rows of said projection means;

said rows being spaced from one another a distance less than said flake length;

drive means operatively connected to at least one row of said projection means for moving said projection means along the length of said row relative to the projection means in an adjacent row;

feeding means for directing randomly oriented flakes from a source of supply in a path extending through said alignment means toward said supporting surface;

the lowermost portion of at least one of said rows being vertically spaced above said supporting surface a distance slightly greater than said mat thickness to permit the flakes passing through adjacent rows to blend beneath said row forming a mat having a width greater than said flake length while the flakes are aligned by said alignment means with their longitudinal axis generally parallel to said rows.

4. The mat forming means of claim 3 including:

elevating means for adjusting the distance between said supporting surface and said lowermost portion of said row as the thickness of said mat varies.

5. The mat forming means of claim 3 wherein:

said orienting means includes a continuous movable roller chain having horizontally extending links pivotally joined end to end by vertically extending shaft means, and said projection means are formed from elongated rods extending from certain of said roller chain shaft means vertically beyond their corresponding links.

6. The mat forming means of claim 3 wherein:

said adjacent rows of said orienting means are formed by a continuous roller chain spanning said alignment means in horizontally extending flat loops with elongated upstanding plates positioned below said chain with the longitudinal axis thereof in the same vertical plane as the set of said roller chain links forming said rows.

7. The mat forming means of claim 6 wherein:

rotatable guide means are provided at the bight of each loop of said roller chain respectively in contact with said chain, one of said guides being operably coupled to said drive means for moving said belt upon actuation of said drive means.

* * * * *